M. W. BLYTH AND T. V. MILES.
PROCESS AND APPARATUS FOR THE TREATMENT OF BENZOL AND THE LIKE.
APPLICATION FILED DEC. 23, 1918.
1,305,870.
Patented June 3, 1919.
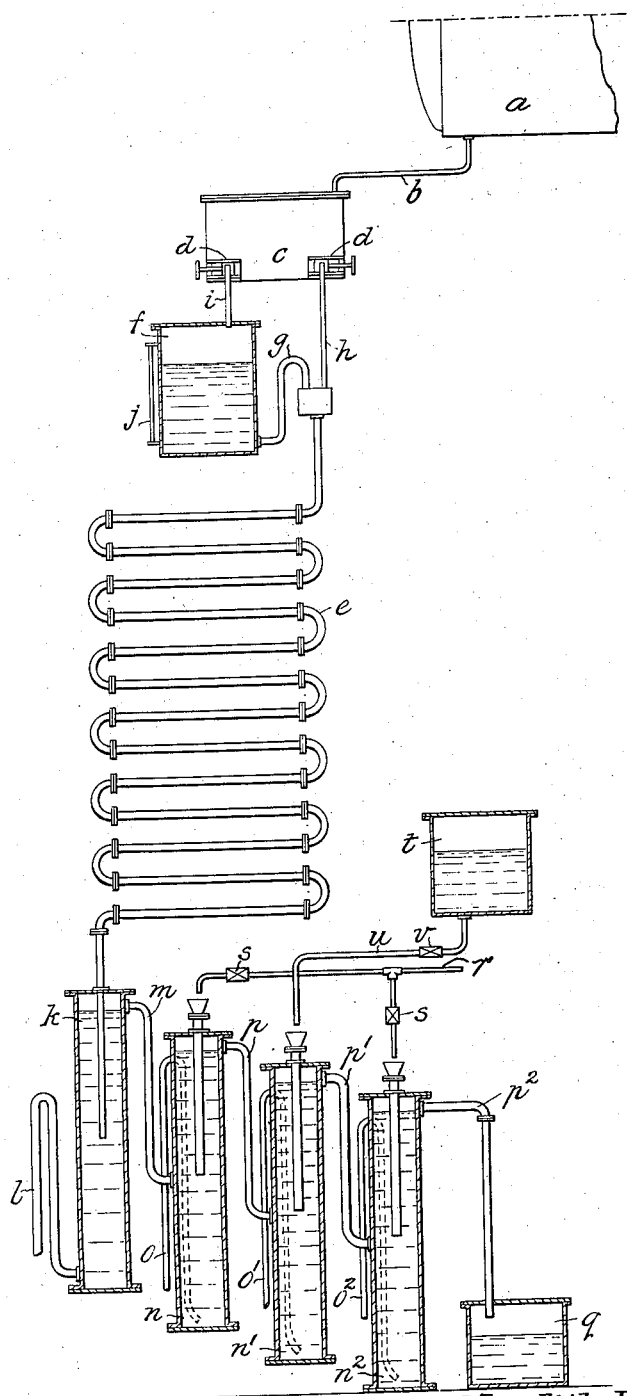

UNITED STATES PATENT OFFICE.

MEREDITH WYNTER BLYTH AND THOMAS VIVIAN MILES, OF SHEFFIELD, ENGLAND.

PROCESS AND APPARATUS FOR THE TREATMENT OF BENZOL AND THE LIKE.

1,305,870.  Specification of Letters Patent.  Patented June 3, 1919.

Application filed December 23, 1918. Serial No. 268,074.

*To all whom it may concern:*

Be it known that we, MEREDITH WYNTER BLYTH and THOMAS VIVIAN MILES, both of Sheffield, in the county of York, England, and both subjects of the King of Great Britain, have invented a new and useful Process and Apparatus for the Treatment of Benzol and the like, of which the following is a specification.

This invention relates to an improved process and apparatus for washing or purifying benzol and other oils such as petroleum or paraffin, carbolic acid and tar acids generally.

In washing or purifying, for example, benzol, it is usual to agitate the unpurified benzol with added predetermined quantities of sulfuric acid, water, soda solution, and water, in succession, the agitation being effected intermittently in separate tanks by mechanical stirrers or the like.

The object of this invention is to provide an improved process and apparatus for washing benzol or other liquids, wherein, the unpurified liquid is admitted to the apparatus without interruption and is conducted through a series of vessels where it is brought into contact with the purifying reagents and is finally discharged from the apparatus in a continuous stream. In this apparatus the use of mechanical stirrers or agitators is avoided.

According to this invention, the liquid to be purified is supplied from a suitable storage vessel to a tank furnished with controlled outlets one of which conducts the liquid to the upper end of a coil of pipes or tubes and the other controlled outlet conducts a proportion of the liquid to a tank containing a purifying reagent which is thereby displaced or forced out of this tank and is conducted to the upper end of the coil of pipes or tubes above mentioned. The controlled outlets are adjusted so that the liquid and the reagent are supplied in predetermined proportions to the coil through which they pass by gravitation into a receiver where the spent reagent is removed by decantation and the partly washed or purified liquid flows over into another vessel where it is subjected to treatment with water or another reagent by being admitted to this vessel below the surface of the reagent contained therein, separated by decantation, and so on until the washing or purifying is completed.

The improved process and apparatus may be employed for washing or purifying benzol, petroleum or paraffin with sulfuric acid, soda, or the like; for the extraction of carbolic acid and tar acids generally from coal tar by means of soda; for the purification of low temperature tar from unsaturated hydrocarbons by means of sulfuric acid; and for the treatment of other materials susceptible to such processes.

The invention is hereinafter described by way of example, in its application to the washing and purifying of benzol and the accompanying drawing shows a diagrammatic elevation of a plant for this purpose.

As shown in this drawing $a$ is a storage tank connected by a pipe $b$ to a regulating tank $c$ provided with two outlets controlled by valves $d$ or similar devices, one of which controls the flow of benzol to the upper end of a coiled or convoluted pipe $e$ and the other valve controls the flow of benzol to a tank $f$ containing sulfuric acid or other reagent. The lower part of this tank $f$ is connected by an overflow pipe $g$ to the upper end of the said pipe $e$.

If now the valves $d$ are opened benzol will flow from the tank $c$ directly into the pipe $e$ through the pipe $h$ and at the same time benzol will flow through the pipe $i$ to the tank $f$ and accumulate on the surface of the reagent contained therein whereby an amount of the reagent corresponding to the weight of benzol thus admitted to the tank $f$ will be forced out through the overflow pipe $g$ into the pipe $e$. Thus the proportions of benzol and sulfuric acid, or other reagent, supplied to the pipe $e$ can be determined by suitable adjustment of the valves $d$.

If desired the tank $f$ may be duplicated or divided into separate compartments so that when one tank or compartment is emptied of sulfuric acid or other reagent, the other may continue in use while the first is re-charged with the reagent. The tank $f$ is provided with a gage glass $j$.

Having passed through the coil $e$ wherein the acid or other reagent effects a purification of the benzol flowing along in contact therewith, these materials enter a receiver $k$ from the lower end of which the spent reagent is drawn off through an overflow pipe $l$. The benzol passes from the upper part of this receiver $k$ through a pipe $m$ to a washing vessel $n$ which it enters at a point below the level of the water or other purifying reagent contained therein. The foul water or spent reagent is drawn off from the bottom of this washing vessel through an overflow pipe $o$ and the benzol is drawn off from the top of this vessel through a pipe $p$. The overflow pipe $o$ extends upwardly from the bottom of the vessel $n$ to a sufficient height above the inlet of the pipe $m$. The benzol passes successively through a number of such washing vessels $n'$, $n^2$ provided with overflow pipes $o'$, $o^2$ and benzol pipes $p'$, $p^2$ and is finally delivered to a purified benzol receiving tank $q$.

In the arrangement illustrated for the treatment of benzol and washing vessels $n$, $n'$, $n^2$ are supplied with water from a pipe $r$ in quantities regulated by valves $s$, $s$, and the vessel $n'$ is supplied with caustic soda solution from a tank $t$ through a pipe $u$ under the control of a valve $v$.

With the apparatus hereinabove described, the regulating valves $d$ having been once adjusted, it is only necessary to maintain the supply of unpurified benzol to the tank $c$, the supply of sulfuric acid to the tank $f$, the supply of caustic soda solution to the vessel $n'$ and of water to the vessels $n$, $n''$ in order to obtain a continuous flow of purified benzol into the receiving tank $q$.

If desired the material treated may be passed in succession through more than one proportioning system such as that comprising the tank $f$ and coils $e$ and any number of washing vessels such as the vessel $n$ may be provided connected one to the other in succession.

What we claim as our invention and desire to secure by Letters Patent is:—

1. A process for treating liquid benzol or the like, which consists in passing the liquid to be treated into a regulating tank, drawing part of said liquid from said tank into a convoluted pipe, drawing another part of said liquid into a vessel containing a purifying agent to displace a predetermined amount of said purifying agent and cause it to mingle with the liquid in said pipe, delivering the mingled liquids from said pipe into a vessel, there causing separation of the liquid and the reagent by decantation, then conducting the purified liquid to other vessels in succession, delivering the liquid below the surface of a washing or cleansing reagent in said vessels, and finally separating the purified liquid by decantation.

2. Apparatus for washing or purifying benzol or the like, comprising a tank with controlled outlets one of which conducts the liquid to be purified to the upper end of a coil of piping and the other controlled outlet conducts a proportion of the liquid to a tank containing a purifying reagent which is thereby displaced and conducted by an overflow pipe to the said coil which delivers the mingled liquid and reagent to a receiver in which they are separated by decantation and the partly purified liquid flows to a washing vessel to which it is admitted below the surface of a washing or purifying reagent contained therein and again separated by decantation.

MEREDITH WYNTER BLYTH.
THOMAS VIVIAN MILES.